Oct. 10, 1967     J. W. MAURER ETAL     3,346,823
PASSIVE DEVICE FOR OBTAINING INDEPENDENT AMPLITUDE AND
PHASE CONTROL OF A UHF OR MICROWAVE SIGNAL
Filed Dec. 18, 1964

John P. Quine
John W. Maurer,
    *INVENTORS.*

BY Harry M. Saragovitz
   Edward J. Kelly
   Herbert Berl
   James T. Deaton

United States Patent Office 3,346,823
Patented Oct. 10, 1967

3,346,823
PASSIVE DEVICE FOR OBTAINING INDEPENDENT AMPLITUDE AND PHASE CONTROL OF A UHF OR MICROWAVE SIGNAL
John W. Maurer, Albany, and John P. Quine, Schenectady, N.Y., assignors, by mesne assignments, to the United States of America as represented by the Secretary of the Army
Filed Dec. 18, 1964, Ser. No. 420,255
8 Claims. (Cl. 333—11)

ABSTRACT OF THE DISCLOSURE

A passive high frequency energy regulating device using four hybrid junctions that can vary phase and amplitude independently or together by independently moving each of two middle hybrid junctions outwardly or inwardly. One of the other hybrid junctions is used as a power divider, and the second of the other hybrid junctions is used as a power combiner. The two middle hybrid junctions are used for both phase shifters and attenuators.

---

This invention relates to a device for controlling the phase and amplitude of a signal, the control of each being independent of the other.

In UHF or microwave signal controls, there is a need for a simple and efficient device that can vary phase and/or amplitude of a signal, each independent of the other, and a device that can be used in phase measuring bridges where it is required to measure the phase and amplitude differences between two signals.

Therefore, it is an object of this invention to provide a passive device that is capable of independently varying the phase and amplitude of a signal such as a UHF or microwave signal.

Another object of this invention is to provide a device that can be used in phase measuring bridges where it is required to measure the phase and amplitude differences between two signals.

A further object of this invention is to provide a passive device that utilizes phase shifters which include 3 db four port hybrids and ganged sliding shorts.

A still further object of this invention is to provide a passive device that utilizes phase shifters which are simple line stretchers of the "trombone" type.

In accordance with this invention, a passive device is provided that has two 3 db four port hybrids interconnected by phase shifters that are made up of either 3 db four port hybrids and ganged shorts or simple line stretchers. This passive device is used to control the phase and amplitude of output signals that are transmitted from one of the two 3 db four port hybrids to the other, with phase control and amplitude control of the signal each being independent of the other.

This invention may be better understood by referring to the drawing forming part of this specification, and in which like numerals are employed to designate corresponding parts throughout the same, and wherein.

Figure 2:
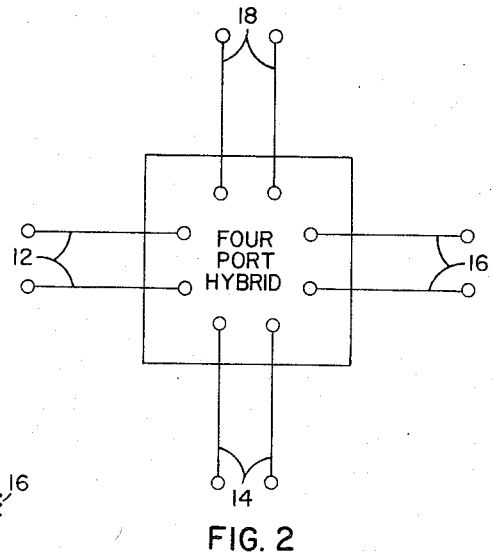
FIGURE 2 is a schematic view of a four port hybrid junction utilized in this invention.
Figure 1:
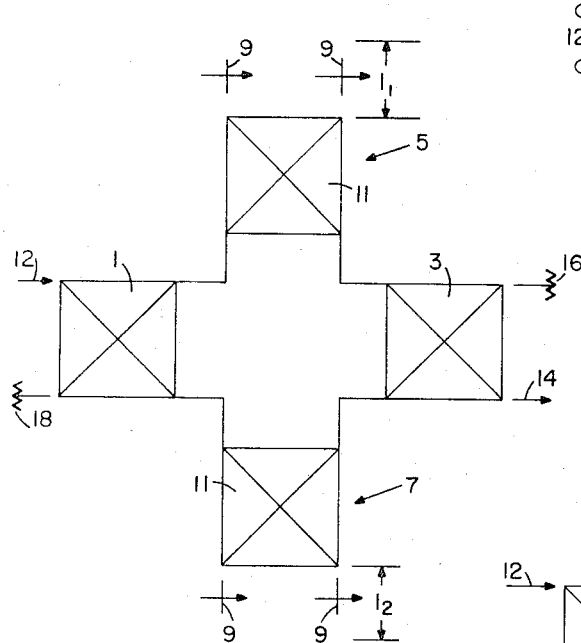
FIGURE 1 is a schematic view illustrating one embodiment of a passive device according to this invention.

This invention may be better understood by referring to the drawing wherein in FIGURE 1, a passive device is illustrated that includes two conventional 3 db hybrid four port junctions 1 and 3 between which are connected two phase shifters 5 and 7. Phase shifters 5 and 7 each consist of a pair of conventional ganged sliding short circuit devices 9 connected to two of the ports of a conventional 3 db hybrid four port junction 11. Each of the 3 db hybrid four port junctions 1, 3 and 11 is like the others. As illustrated in FIGURE 2, each 3 db hybrid four port junction includes four ports 12, 14, 16 and 18, and each port comprises two terminals. Thus, each 3 db hybrid four port junction is an eight terminal electrical network. Each 3 db hybrid four port junction as used in this device is defined as having a property such that when matched loads are on ports 14, 16 and 18 and a signal is applied to port 12, equal signals will be received at ports 14 and 16 and no signal at port 18, and no reflection from port 12. Such a device can be realized at very low frequencies, exemplified by conventional telephone line devices.

In operation, referring to FIGURE 1, when an input power signal is applied at port 12 of junction 1, junction 1 acts as a power divider for dividing the input power applied at port 12 between phase shifters 5 and 7, and junction 3 acts as a power combiner. Phase shifters 5 and 7 are adjusted by adjusting ganged sliding short circuit devices 9 to obtain the desired output at output port 14 of junction 3. If the two short circuit positions $1_1$ and $1_2$ of ganged sliding short circuit devices 9 are equal, then the output signal is equal in amplitude to the input signal. A change in the phase of the output signal without a change in its amplitude is obtained by making equal increments in $1_1$ and $1_2$ (increase both or decrease both, that is, forward ganging). A reduction in the amplitude of the output signal without a change in its phase is obtained by making equal and opposite increments in $1_1$ and $1_2$, that is, reverse ganging. In the circuit of FIGURE 1, port 16 of junction 3 acts as a dummy load to absorb power incident on that port as determined by the settings of phase shifters 5 and 7, and port 18 of junction 1 acts as a dummy load to absorb load due to load mismatch or imperfections of the components.

Figure 3:
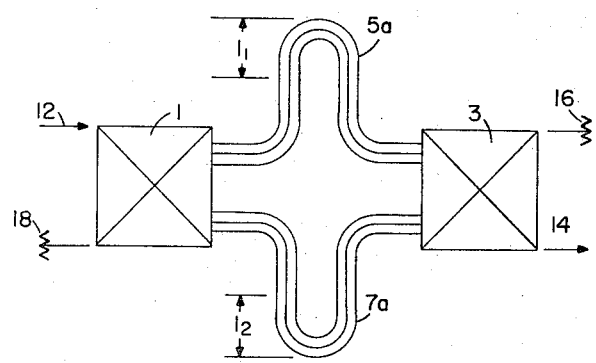
FIGURE 3 is a schematic illustration of another passive device according to this invention.
Figure 4:
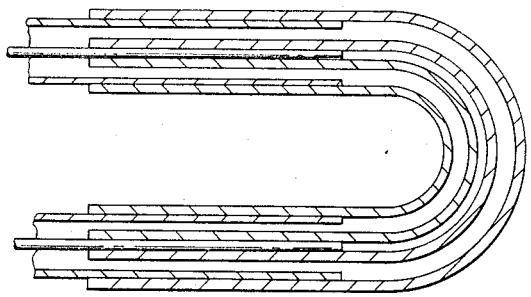
FIGURE 4 is a sectional view of one of the phase shifters used in the passive device of FIGURE 3.

Another embodiment of the passive device is shown in FIGURE 3. In this embodiment, elements 1, 3, 12, 14, 16 and 18 correspond to and have the same function as elements 1, 3, 12, 14, 16 and 18 respectively as described relative to FIGURE 1 supra. In the embodiment of FIGURE 3, phase shifters 5a and 7a are substituted for phase shifters 5 and 7 respectively of FIGURE 1. Phase shifters 5a and 7a are simple line stretchers of the "trombone" type illustrated in FIGURE 4. Phase shifters 5a and 7a are adjusted through positions $1_1$ and $1_2$, in the same manner as the ganged sliding short circuit devices 9 of FIGURE 1, to vary the phase and amplitude of the output signal at output port 14 of junction 3 in the same manner as that described for FIGURE 1 supra.

It is to be understood that the forms of our invention, herewith shown and described, are to be taken as preferred examples of the same, and that various changes in the arrangement of parts may be resorted to, without departing from the spirit of our invention, or the scope of the subjoined claims.

We claim:

1. A passive device including: two 3 db hybrid four port junctions which are interconnected by two phase shifters, said phase shifters having ganged devices coupled thereto for independently or simultaneously adjusting each of said phase shifters in either the forward or reverse direction for varying the phase and amplitude of a power input signal applied to one port of one of the 3 db hybrid four port junctions before appearing as an output signal at one of the ports of the other 3 db hybrid four port junction.

2. A passive device as set forth in claim 1, wherein said two phase shifters are simple "trombone" type line stretchers.

3. A passive device as set forth in claim 1, wherein each of said two phase shifters comprises a 3 db hybrid four port junction, two ports of which are connected to a pair of ganged sliding short circuit devices.

4. A passive device as set forth in claim 1, wherein said phase shifters are simple "trombone" type line stretchers.

5. A passive device as set forth in claim 1, wherein each of said phase shifters comprises a 3 db hybrid four port junction, two ports of which are connected to a pair of ganged sliding short circuit devices.

6. A passive device including: a pair of 3 db hybrid four port junctions; a first phase shifter interconnecting a first port of each of said junctions; a second phase shifter interconnecting a second port of each of said junctions; said first and second ports of one of said junctions being power divider ports; said first and second ports of the other of said junctions being power combiner ports; third and fourth ports of said one of said junctions being power input and dummy load ports; third and fourth ports of the other of said junctions being power output and dummy load ports; and said first and second phase shifters having ganged devices coupled thereto for independently or simultaneously adjusting each of said phase shifters in either the forward or reverse direction for varying the phase and amplitude of a power signal transmitted from the power input port to the power output port.

7. A passive device as set forth in claim 6, wherein said first and second phase shifters include simple "trombone" type line stretchers.

8. A passive device as set forth in claim 6, wherein each of said first and second phase shifters includes a 3 db hybrid four port junction, two ports of which are interconnected to said pair of junctions, and the other two ports of which are connected to a pair of ganged sliding short circuit devices.

References Cited
UNITED STATES PATENTS

| | | | |
|---|---|---|---|
| 2,476,311 | 7/1949 | Learned | 333—73 |
| 2,951,996 | 9/1960 | Pan | 333—11 |
| 3,058,071 | 10/1962 | Walsh et al. | 333—11 |
| 3,081,440 | 3/1963 | Augustine et al. | 333—11 |
| 3,184,691 | 5/1965 | Marcatili et al. | 333—11 |

HERMAN KARL SAALBACH, *Primary Examiner.*

ELI LIEBERMAN, *Examiner.*

R. D. COHN, M. NUSSBAUM, *Assistant Examiners.*